United States Patent
Tian et al.

(10) Patent No.: US 9,375,826 B2
(45) Date of Patent: Jun. 28, 2016

(54) ABRASIVE ARTICLE AND METHOD OF FORMING

(75) Inventors: Yinggang Tian, Shrewsbury, MA (US); Arup K. Khaund, Northborough, MA (US); John Pearlman, Berlin, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 302 days.

(21) Appl. No.: 13/618,328

(22) Filed: Sep. 14, 2012

(65) Prior Publication Data

US 2013/0205676 A1    Aug. 15, 2013

Related U.S. Application Data

(60) Provisional application No. 61/535,530, filed on Sep. 16, 2011.

(51) Int. Cl.
| | |
|---|---|
| *B24D 3/00* | (2006.01) |
| *B24D 11/00* | (2006.01) |
| *B24B 27/06* | (2006.01) |
| *C09C 1/62* | (2006.01) |
| *B24D 3/06* | (2006.01) |

(52) U.S. Cl.
CPC ............ *B24D 3/004* (2013.01); *B24B 27/0633* (2013.01); *B24D 3/06* (2013.01); *C09C 1/62* (2013.01); *C01P 2004/84* (2013.01)

(58) Field of Classification Search
CPC ................................ B24D 11/00; B24D 3/004
See application file for complete search history.

(56) References Cited

U.S. PATENT DOCUMENTS

| | | | |
|---|---|---|---|
| 2,764,543 | A | 9/1952 | Comstock et al. |
| 2,784,536 | A | 3/1957 | Barron |
| 2,793,478 | A | 5/1957 | Rohowetz |
| 3,150,470 | A | 9/1964 | Barron |
| 3,178,273 | A | 4/1965 | Libal |
| 3,854,898 | A | 12/1974 | Whitney, Jr. et al. |
| 3,884,212 | A | 5/1975 | Armstrong et al. |
| 3,894,673 | A | 7/1975 | Lowder et al. |
| 3,906,684 | A | 9/1975 | Marshall et al. |
| 3,997,302 | A | 12/1976 | Supkis |

(Continued)

FOREIGN PATENT DOCUMENTS

| | | |
|---|---|---|
| CH | 599837 A5 | 5/1978 |
| CN | 1456410 A | 11/2003 |

(Continued)

OTHER PUBLICATIONS

Enomoto, Toshiyuki et al "Development of a Resinoid Diamond Wire Containing Metal Power for Slicing a Slicing Ingot." Annals of the CIRP. 32.1 (1983): 273-276.

(Continued)

*Primary Examiner* — Pegah Parvini
(74) *Attorney, Agent, or Firm* — Abel Law Group, LLP; Joseph P Sullivan

(57) ABSTRACT

An abrasive article including a substrate made of a wire, abrasive particles affixed to the substrate, the abrasive particles having a first coating layer overlying the abrasive particles, and a second coating layer different than the first coating layer overlying the first coating layer. The abrasive article further including a bonding layer overlying the substrate and abrasive particles.

15 Claims, 2 Drawing Sheets

(56) References Cited

U.S. PATENT DOCUMENTS

| | | | |
|---|---|---|---|
| 3,997,902 | A | 12/1976 | Nard |
| 4,015,931 | A | 4/1977 | Thakur |
| 4,018,576 | A | 4/1977 | Lowder et al. |
| 4,031,851 | A * | 6/1977 | Camahort .................. 118/718 |
| 4,055,700 | A | 10/1977 | Ronnquist et al. |
| 4,187,828 | A | 2/1980 | Schmid |
| 4,384,564 | A | 5/1983 | Smith et al. |
| 4,485,757 | A | 12/1984 | Ebner |
| 4,627,950 | A | 12/1986 | Matsui et al. |
| 4,643,740 | A | 2/1987 | Nicolson |
| 4,646,710 | A | 3/1987 | Schmid et al. |
| 4,681,538 | A | 7/1987 | DeLuca et al. |
| 4,684,052 | A | 8/1987 | McDonald et al. |
| 4,727,852 | A | 3/1988 | Schmid et al. |
| 4,776,862 | A | 10/1988 | Wiand |
| 4,811,170 | A * | 3/1989 | Pammer .................. 361/783 |
| 4,866,888 | A | 9/1989 | Murai et al. |
| 4,907,564 | A | 3/1990 | Sowa et al. |
| 4,968,326 | A | 11/1990 | Wiand |
| 4,974,373 | A | 12/1990 | Kawashima et al. |
| 5,062,865 | A | 11/1991 | Chen et al. |
| 5,127,197 | A | 7/1992 | Brukvoort et al. |
| 5,127,924 | A | 7/1992 | Russell |
| 5,213,591 | A | 5/1993 | Celikkaya et al. |
| 5,218,949 | A | 6/1993 | Tomlinson et al. |
| 5,250,084 | A | 10/1993 | Lansell et al. |
| 5,251,802 | A | 10/1993 | Bruxvoort et al. |
| 5,318,604 | A | 6/1994 | Gorsuch et al. |
| 5,377,568 | A | 1/1995 | Hauser |
| 5,377,659 | A | 1/1995 | Tank et al. |
| 5,383,443 | A | 1/1995 | Buyens |
| 5,438,973 | A | 8/1995 | Schmid et al. |
| 5,454,750 | A | 10/1995 | Schmid et al. |
| 5,492,771 | A | 2/1996 | Lowder et al. |
| 5,496,386 | A | 3/1996 | Broberg et al. |
| 5,511,718 | A | 4/1996 | Lowder et al. |
| 5,544,643 | A | 8/1996 | Bauer et al. |
| 5,571,296 | A | 11/1996 | Barber, Jr. et al. |
| 5,578,098 | A | 11/1996 | Gagliardi et al. |
| 5,616,065 | A | 4/1997 | Egglhuber |
| 5,643,055 | A | 7/1997 | Linzell |
| 5,660,320 | A | 8/1997 | Hoffmuller et al. |
| 5,707,509 | A | 1/1998 | Hartweg |
| 5,840,089 | A | 11/1998 | Chesley et al. |
| 5,846,269 | A | 12/1998 | Shiue et al. |
| 5,855,314 | A | 1/1999 | Shiue et al. |
| 5,913,305 | A | 6/1999 | Hauser |
| 5,924,917 | A | 7/1999 | Benedict |
| 5,935,407 | A | 8/1999 | Nenov et al. |
| 5,964,210 | A | 10/1999 | Hodsden |
| 5,975,988 | A | 11/1999 | Christianson |
| 6,056,794 | A | 5/2000 | Stoetzel et al. |
| 6,065,462 | A | 5/2000 | Hodsden et al. |
| 6,070,570 | A | 6/2000 | Ueoka et al. |
| 6,102,024 | A | 8/2000 | Buljan et al. |
| 6,194,068 | B1 | 2/2001 | Ohashi et al. |
| 6,194,086 | B1 | 2/2001 | Nenov et al. |
| 6,228,133 | B1 | 5/2001 | Thurber et al. |
| 6,279,564 | B1 | 8/2001 | Hodsden et al. |
| 6,286,498 | B1 | 9/2001 | Sung |
| 6,311,684 | B1 | 11/2001 | Hodsden et al. |
| 6,319,108 | B1 | 11/2001 | Adefris et al. |
| 6,368,198 | B1 | 4/2002 | Sung et al. |
| 6,463,921 | B2 | 10/2002 | Shimazaki et al. |
| 6,613,113 | B2 | 9/2003 | Minick et al. |
| 6,679,243 | B2 | 1/2004 | Sung |
| 6,755,720 | B1 | 6/2004 | Ishizaki et al. |
| 6,783,442 | B2 | 8/2004 | Lukschandel et al. |
| 6,790,126 | B2 | 9/2004 | Wood et al. |
| 6,797,023 | B2 | 9/2004 | Knapp et al. |
| 6,830,598 | B1 | 12/2004 | Sung |
| 6,858,050 | B2 | 2/2005 | Palmgren |
| 6,899,920 | B2 | 5/2005 | Meyer |
| 6,915,796 | B2 | 7/2005 | Sung |
| 6,939,413 | B2 | 9/2005 | Crockett |
| 7,089,925 | B1 | 8/2006 | Lin et al. |
| 7,124,753 | B2 | 10/2006 | Sung |
| 7,134,430 | B2 | 11/2006 | Kim et al. |
| 7,261,752 | B2 | 8/2007 | Sung |
| 7,306,508 | B2 | 12/2007 | Kawasaki et al. |
| 7,435,276 | B2 * | 10/2008 | Chen et al. .................. 51/307 |
| 7,556,558 | B2 | 7/2009 | Palmgren |
| 7,704,127 | B2 | 4/2010 | Taniguchi et al. |
| 7,926,478 | B2 | 4/2011 | Nakai et al. |
| 8,037,878 | B2 | 10/2011 | Kitagawa et al. |
| 8,206,472 | B2 | 6/2012 | Tani et al. |
| 8,257,572 | B2 | 9/2012 | Castro et al. |
| 8,291,895 | B2 | 10/2012 | Sudarshan et al. |
| 8,425,640 | B2 | 4/2013 | Liebelt et al. |
| 8,677,986 | B2 | 3/2014 | Kazahaya et al. |
| 8,707,944 | B2 | 4/2014 | Morita et al. |
| 8,720,429 | B2 | 5/2014 | Lange et al. |
| 8,802,602 | B2 | 8/2014 | Schmitjes et al. |
| 8,820,308 | B2 | 9/2014 | Sudarshan et al. |
| 2001/0025457 | A1 | 10/2001 | Tselesin |
| 2002/0010068 | A1 | 1/2002 | Komatsu |
| 2002/0077054 | A1 | 6/2002 | Sung |
| 2002/0100469 | A1 | 8/2002 | Shimazaki et al. |
| 2003/0084894 | A1 | 5/2003 | Sung |
| 2003/0121212 | A1 | 7/2003 | Minick et al. |
| 2003/0134577 | A1 | 7/2003 | Coad |
| 2003/0140914 | A1 | 7/2003 | Lukschandel et al. |
| 2004/0107648 | A1 | 6/2004 | Sung |
| 2004/0112359 | A1 | 6/2004 | Sung |
| 2004/0244789 | A1 | 12/2004 | Jentgens |
| 2005/0018642 | A1 | 1/2005 | Nakamura |
| 2005/0103320 | A1 | 5/2005 | Ebner |
| 2006/0016127 | A1 | 1/2006 | Sung |
| 2006/0083688 | A1 | 4/2006 | Singaram et al. |
| 2006/0194038 | A1 | 8/2006 | You et al. |
| 2006/0258268 | A1 | 11/2006 | Miyata et al. |
| 2007/0023027 | A1 | 2/2007 | Nakai et al. |
| 2007/0051354 | A1 | 3/2007 | Sung |
| 2007/0051355 | A1 | 3/2007 | Sung |
| 2007/0151388 | A1 | 7/2007 | Yazawa et al. |
| 2007/0151554 | A1 | 7/2007 | Song et al. |
| 2007/0261690 | A1 | 11/2007 | Jentgens |
| 2007/0283944 | A1 | 12/2007 | Hukin |
| 2008/0053000 | A1 | 3/2008 | Palmgren et al. |
| 2008/0141593 | A1 | 6/2008 | Bhatia |
| 2008/0141994 | A1 | 6/2008 | Skovgaard-Soerensen et al. |
| 2008/0148650 | A1 | 6/2008 | You |
| 2008/0206576 | A1 | 8/2008 | Qian et al. |
| 2008/0212733 | A1 | 9/2008 | Pop et al. |
| 2008/0261499 | A1 | 10/2008 | Tani et al. |
| 2008/0271783 | A1 | 11/2008 | Murakami et al. |
| 2009/0064983 | A1 | 3/2009 | Sudarshan et al. |
| 2009/0120422 | A1 | 5/2009 | Taniguchi |
| 2009/0202781 | A1 | 8/2009 | Hall et al. |
| 2009/0242410 | A1 | 10/2009 | Castro et al. |
| 2009/0283089 | A1 | 11/2009 | Sung |
| 2010/0197202 | A1 | 8/2010 | Branagan et al. |
| 2011/0009039 | A1 | 1/2011 | Balagani et al. |
| 2011/0039070 | A1 | 2/2011 | Liebelt et al. |
| 2011/0045292 | A1 | 2/2011 | Tian et al. |
| 2011/0263187 | A1 | 10/2011 | Liu et al. |
| 2011/0308371 | A1 | 12/2011 | Morita et al. |
| 2012/0037140 | A1 | 2/2012 | Campos et al. |
| 2012/0055097 | A1 | 3/2012 | Tian et al. |
| 2012/0167482 | A1 | 7/2012 | Tian et al. |
| 2012/0216787 | A1 | 8/2012 | Morita et al. |
| 2013/0000211 | A1 | 1/2013 | Upadhyay et al. |
| 2013/0032129 | A1 | 2/2013 | Ontani et al. |
| 2013/0061535 | A1 | 3/2013 | Tian et al. |
| 2013/0084786 | A1 | 4/2013 | Rehrig et al. |
| 2013/0092143 | A1 | 4/2013 | Sudarshan et al. |
| 2013/0206676 | A1 | 8/2013 | Tian et al. |
| 2013/0219801 | A1 | 8/2013 | Liebelt et al. |
| 2014/0007513 | A1 | 1/2014 | Rehrig et al. |
| 2014/0011434 | A1 | 1/2014 | Puzemis et al. |
| 2014/0013675 | A1 | 1/2014 | Tian et al. |
| 2014/0017984 | A1 | 1/2014 | Rehrig et al. |

(56) References Cited

U.S. PATENT DOCUMENTS

| | | | |
|---|---|---|---|
| 2014/0017985 A1 | 1/2014 | Tian et el. | |
| 2014/0150766 A1 | 6/2014 | Che et al. | |
| 2014/0311472 A1 | 10/2014 | Tian et al. | |

FOREIGN PATENT DOCUMENTS

| | | | |
|---|---|---|---|
| CN | 1488480 A | 4/2004 |
| CN | 1583336 A | 2/2005 |
| CN | 1721113 A | 1/2006 |
| CN | 1739927 A | 3/2006 |
| CN | 101066614 A | 11/2007 |
| CN | 201283606 Y | 8/2009 |
| CN | 101564828 A | 10/2009 |
| CN | 101712135 A | 5/2010 |
| DE | 10-2004-043718 A1 | 3/2006 |
| EP | 0237784 | 6/1991 |
| EP | 916449 A1 | 5/1999 |
| EP | 1371438 | 12/2003 |
| EP | 1475463 | 11/2004 |
| EP | 1685934 A1 | 8/2006 |
| EP | 2497602 A1 | 9/2012 |
| GB | 876605 A | 9/1961 |
| GB | 962357 A | 7/1964 |
| GB | 1254365 A | 11/1971 |
| GB | 1342359 A | 1/1974 |
| JP | 61-71949 | 4/1986 |
| JP | 63-102868 | 5/1988 |
| JP | 30-79264 | 4/1991 |
| JP | 5016066 A | 1/1993 |
| JP | H07-096454 | 4/1995 |
| JP | H08-126953 | 5/1996 |
| JP | H09-150314 | 6/1997 |
| JP | H09-155631 | 6/1997 |
| JP | H09-254006 A | 9/1997 |
| JP | 10-034544 | 2/1998 |
| JP | H10-118938 | 5/1998 |
| JP | 10-256581 | 9/1998 |
| JP | H10-328932 A | 12/1998 |
| JP | H11-216657 A | 8/1999 |
| JP | H11-216658 A | 9/1999 |
| JP | 11-277398 | 10/1999 |
| JP | 2957571 B1 | 10/1999 |
| JP | H11-320379 | 11/1999 |
| JP | H11-347911 | 12/1999 |
| JP | 2000-052226 | 2/2000 |
| JP | 2000-071160 | 3/2000 |
| JP | 2000-071162 | 3/2000 |
| JP | 2000-094297 | 4/2000 |
| JP | 2000-158318 | 6/2000 |
| JP | 2000-158319 | 6/2000 |
| JP | 2000-218504 | 8/2000 |
| JP | 2000-246542 | 9/2000 |
| JP | 2000-246654 A | 9/2000 |
| JP | 2000-263452 | 9/2000 |
| JP | 3-104553 B2 | 10/2000 |
| JP | 2000-271872 | 10/2000 |
| JP | 2000-288902 | 10/2000 |
| JP | 2001-054850 | 2/2001 |
| JP | 2001-105295 | 4/2001 |
| JP | 2001-113519 A | 4/2001 |
| JP | 2001-259993 A | 9/2001 |
| JP | 2001-277092 A | 10/2001 |
| JP | 2001-287146 A | 10/2001 |
| JP | 2001-341076 | 12/2001 |
| JP | 2002172564 A | 6/2002 |
| JP | 2002-205272 | 7/2002 |
| JP | 2002-254286 A | 9/2002 |
| JP | 2002-254327 | 9/2002 |
| JP | 2002-273663 A | 9/2002 |
| JP | 2002-326151 A | 11/2002 |
| JP | 2002-331466 | 11/2002 |
| JP | 2002-361566 A | 12/2002 |
| JP | 2003-231063 A | 8/2003 |
| JP | 2003525130 A | 8/2003 |
| JP | 2003-275970 A | 9/2003 |
| JP | 2003291057 A | 10/2003 |
| JP | 2004009239 A | 1/2004 |
| JP | 2004-050318 | 2/2004 |
| JP | 31-03807 U | 6/2004 |
| JP | 2004-174680 | 6/2004 |
| JP | 2004-209573 A | 7/2004 |
| JP | 2004-216553 A | 8/2004 |
| JP | 2004-261889 A | 9/2004 |
| JP | 2004-338023 A | 12/2004 |
| JP | 2005-007221 A | 1/2005 |
| JP | 2002036091 A | 2/2005 |
| JP | 2005-238377 A | 9/2005 |
| JP | 2006-007387 A | 1/2006 |
| JP | 37-77285 B2 | 5/2006 |
| JP | 2006-123024 A | 5/2006 |
| JP | 2006123055 A | 5/2006 |
| JP | 2006130636 A | 5/2006 |
| JP | 2006-150505 A | 6/2006 |
| JP | 2006-179677 A | 7/2006 |
| JP | 2006-181701 A | 7/2006 |
| JP | 2006-231479 A | 9/2006 |
| JP | 2006-272499 A | 10/2006 |
| JP | 2007-021677 A | 2/2007 |
| JP | 2007-044671 A | 2/2007 |
| JP | 2007-061976 A | 3/2007 |
| JP | 2007-152485 | 6/2007 |
| JP | 2007-152486 | 6/2007 |
| JP | 2007152485 A | 6/2007 |
| JP | 2007-196312 A | 8/2007 |
| JP | 2007-196329 A | 8/2007 |
| JP | 2007-203393 A | 8/2007 |
| JP | 2007-203417 A | 8/2007 |
| JP | 2007-237628 A | 9/2007 |
| JP | 2007-253268 A | 10/2007 |
| JP | 2007-268627 A | 10/2007 |
| JP | 2007-281176 A | 10/2007 |
| JP | 2007-307261 A | 11/2007 |
| JP | 2008-068332 A | 3/2008 |
| JP | 2008-221406 A | 9/2008 |
| JP | 2009-066689 A | 4/2009 |
| JP | 2010-000583 A | 1/2010 |
| JP | 2010131698 A | 6/2010 |
| JP | 2010-284754 | 12/2010 |
| JP | 2011-016208 A | 1/2011 |
| JP | 2011137213 A | 7/2011 |
| JP | 2011-161613 | 8/2011 |
| KR | 2000-0033534 A | 6/2000 |
| KR | 2001-0055980 A | 7/2001 |
| KR | 10-2006-0006856 A | 1/2006 |
| RU | 2078680 C1 | 5/1997 |
| RU | 83210 | 5/2009 |
| TW | 442370 B | 6/2001 |
| TW | I291389 B | 12/2007 |
| TW | 201111106 A | 4/2011 |
| WO | 98/05466 | 2/1998 |
| WO | 98/35784 A1 | 8/1998 |
| WO | 99/46077 | 9/1999 |
| WO | 00/61324 | 10/2000 |
| WO | 01/04227 A2 | 1/2001 |
| WO | 2004/069479 | 8/2004 |
| WO | 2005/064677 A1 | 7/2005 |
| WO | 2006070534 | 7/2006 |
| WO | 2007/039934 | 4/2007 |
| WO | 2006/083688 | 8/2007 |
| WO | 2008/000072 | 1/2008 |
| WO | 2009/064345 A2 | 5/2009 |
| WO | 2009064345 A2 | 5/2009 |
| WO | 2009-158507 A2 | 12/2009 |
| WO | 2009158507 A2 | 12/2009 |
| WO | 2010-000584 A | 1/2010 |
| WO | 2010071198 | 6/2010 |
| WO | 2010/125083 | 11/2010 |
| WO | 2010/125085 A1 | 11/2010 |
| WO | 2011/020105 A2 | 2/2011 |
| WO | 2011/020109 A2 | 2/2011 |
| WO | 2011055692 A1 | 5/2011 |
| WO | 2012/092614 A2 | 7/2012 |
| WO | 2013/040423 A2 | 3/2013 |

(56) References Cited

FOREIGN PATENT DOCUMENTS

| WO | 2013/049204 A2 | 4/2013 |
|---|---|---|
| WO | 2013/147892 A2 | 10/2013 |
| WO | 2014/004982 A1 | 1/2014 |
| WO | 2014/004991 A1 | 1/2014 |
| WO | 2014/005009 A1 | 1/2014 |
| WO | 2014/005015 A1 | 1/2014 |
| WO | 2014/005028 A1 | 1/2014 |
| WO | 2014/005037 A1 | 1/2014 |
| WO | 2014172611 A1 | 10/2014 |

OTHER PUBLICATIONS

Jun Sugawara et al., "Development of fixed abrasive-grain wire saw with less cutting loss" SEI Technical Review No. 58, Jun. 2004, pp. 7-11.

International Search Report for PCT/US2012/031699 mailed Nov. 16, 2012.

Daisuke Ide, "Resin Bond Diamond wire for slicing ceramics", Industrial Diamond Review vol. 2/2007, pp. 32-34.

Y. Chiba et al., "Development of a high-speed manufacturing method for electroplated diamond wire tools", Annals of the CIRP vol. 52/1/2003, pp. 281-284.

Osamu Kamiya et al., "Diamond and metal bonding by active solder for micro-cutting wire", Int. J. of Mdern Physics B, vol. 20, Nos. 25-27 (2006) pp. 3932-3937.

Fujisawa, M. et al. "Precision Sawing with Wire Saw." Annals of the CIRP. 32.1 (1983): 87-90.

Conversion US mesh (tamis)—microns: http://www.granuloshop.com/Conversion.htm (Sep. 2, 2003).

International Search Report for PCT/US2010/045643 mailed Apr. 29, 2011.

International Search Report for PCT/US2011/068240 mailed Aug. 27, 2012.

Handbook of Thermoset Plastics, 2nd edition, p. 28, 1998.

International Search Report for PCT/US2010/045647 mailed Apr. 29, 2011.

U.S. Appl. No. 13/930,577, filed Jun. 28, 2013.

International Search Report for PCT/US2012/055529 mailed Feb. 21, 2013.

International Search Report for PCT/US2012/057334 mailed Mar. 28, 2013.

Higashi, Taisuke et al., Developement of Low Melting Temperature Coating Materials for High Performance Diamonds Wire Saw: Effect of an Additive on Mechanical Properties.

Nakamura Chonko Co., Ltd., "Company Report", Mar. 31, 2010, 10 pages.

International Search Report for PCT/US2013/048549 mailed Sep. 11, 2013.

International Search Report for PCT/US2013/048565 mailed Aug. 27, 2013.

International Search Report for PCT/US2013/048587 mailed Sep. 17, 2013.

International Search Report for PCT/US2013/048609 mailed Sep. 2, 2013.

International Search Report for PCT/US2013/048511 mailed Aug. 27, 2013.

International Search Report for PCT/US2013/048491 mailed Aug. 26, 2013.

Patel, Mitesh M., "Characterizing Fatigue and Fracture Response of Medical Grade Nickel-Titanium Alloys by Rotary Beam Testing," Presented at the ASTM Symposium on Fatigue and Fracture of Medical Metallic Materials and Devices, Dallas, Texas, Nov. 2005, 12 pages.

PCT/US2012/055529 International Search Report mailed Feb. 21, 2013, 1 page.

International Search Report for PCT/US2014/034611 mailed Aug. 28, 2014.

Copper and Copper Alloys Jan. 1, 2001 (exerpt)—Davis, ASM International; pp. 127-130.

International Search Report for International Application No. PCT/JP2010/069294 dated Nov. 22, 2010.

* cited by examiner

ABRASIVE ARTICLE AND METHOD OF FORMING

This application claims priority to and the benefit of U.S. Provisional Patent Application 61/535,530 which was filed on Sep. 16, 2011, and is incorporated herein by reference in its entirety.

BACKGROUND

1. Field of the Disclosure

The following is directed to methods of forming abrasive articles, and particularly, single-layered abrasive articles.

2. Description of the Related Art

A variety of abrasive tools have been developed over the past century for various industries for the general function of removing material from a workpiece, including for example, sawing, drilling, polishing, cleaning, carving, and grinding. In particular reference to the electronics industry, abrasive tools suitable for slicing single crystal ingots of material to form wafers is particularly pertinent. As the industry continues to mature, the ingots have increasingly larger diameters, and it has become acceptable to use loose abrasives and wire saws for such works due to yield, productivity, affected layers, dimensional constraints and other factors.

Generally, wire saws are abrasive tools that include abrasive particles attached to a long length of wire that can be spooled at high speeds to produce a cutting action. While circular saws are limited to a cutting depth of less than the radius of the blade, wire saws can have greater flexibility allowing for cutting of straight or profiled cutting paths.

Various approaches have been taken in conventional fixed abrasive wire saws, such as producing these articles by sliding steel beads over a metal wire or cable, wherein the beads are separated by spacers. These beads may be covered by abrasive particles which are commonly attached by either electroplating or sintering. However, electroplating and sintering operations can be time consuming and thus costly ventures, prohibiting rapid production of the wire saw abrasive tool. Most of these wire saws have been used in applications, where kerf loss is not so dominating as in electronics applications, often to cut stone or marble. Some attempts have been made to attach abrasive particles via chemical bonding processes, such as brazing, but such fabrication methods reduce the tensile strength of the wire saw, and the wire saw becomes susceptible to breaking and premature failure during cutting applications under high tension. Other wire saws may use a resin to bind the abrasives to the wire. Unfortunately, the resin bonded wire saws tend to wear quickly and the abrasives are lost well before the useful life of the particles is realized, especially when cutting through hard materials.

Accordingly, the industry continues to need improved abrasive tools, particularly in the realm of wire sawing.

SUMMARY

According to a first aspect, an abrasive article includes a substrate comprising a wire, abrasive particles affixed to the substrate, the abrasive particles having a first coating layer overlying the abrasive particles, and a second coating layer different than the first coating layer overlying the first coating layer. The abrasive article further including a bonding layer overlying the substrate and abrasive particles.

According to another aspect, a method of forming an abrasive article includes providing a substrate comprising an elongated body having an aspect ratio of length:width of at least about 10:1, treating the substrate to form a binding film, placing abrasive particles comprising a second coating layer including a low temperature metal alloy (LTMA) material on the binding film, treating the substrate to bond the abrasive particles to the substrate, and forming a bonding layer over the abrasive particles.

In yet another aspect, a method of forming an abrasive article includes providing a substrate comprising an elongated body having an aspect ratio of length:width of at least about 10:1, treating the substrate to form a binding film, placing abrasive particles on the binding film, the abrasive particles comprising a first coating layer including a metal, and a second coating layer overlying the first coating layer including a low temperature metal alloy (LTMA) material, and heating the substrate to form a diffusion bonding region between the second coating layer of the abrasive particles and portions of the substrate.

Another aspect is directed to an abrasive article having a substrate made of an elongated body having an aspect ratio of length:width of at least about 10:1, abrasive particles affixed to the substrate, and a discontinuous coating including a metal material defining coated regions comprising a low temperature metal alloy (LTMA) material surrounding and overlying a majority of the abrasive particles and gap region between the abrasive particles.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following is directed to abrasive articles, and particularly abrasive articles suitable for abrading and sawing through workpieces. In particular instances, the abrasive articles herein can form wire saws, which may be used in processing of sensitive, crystalline materials in the electronics industry, optics industry, and other associated industries.

Figure 1:
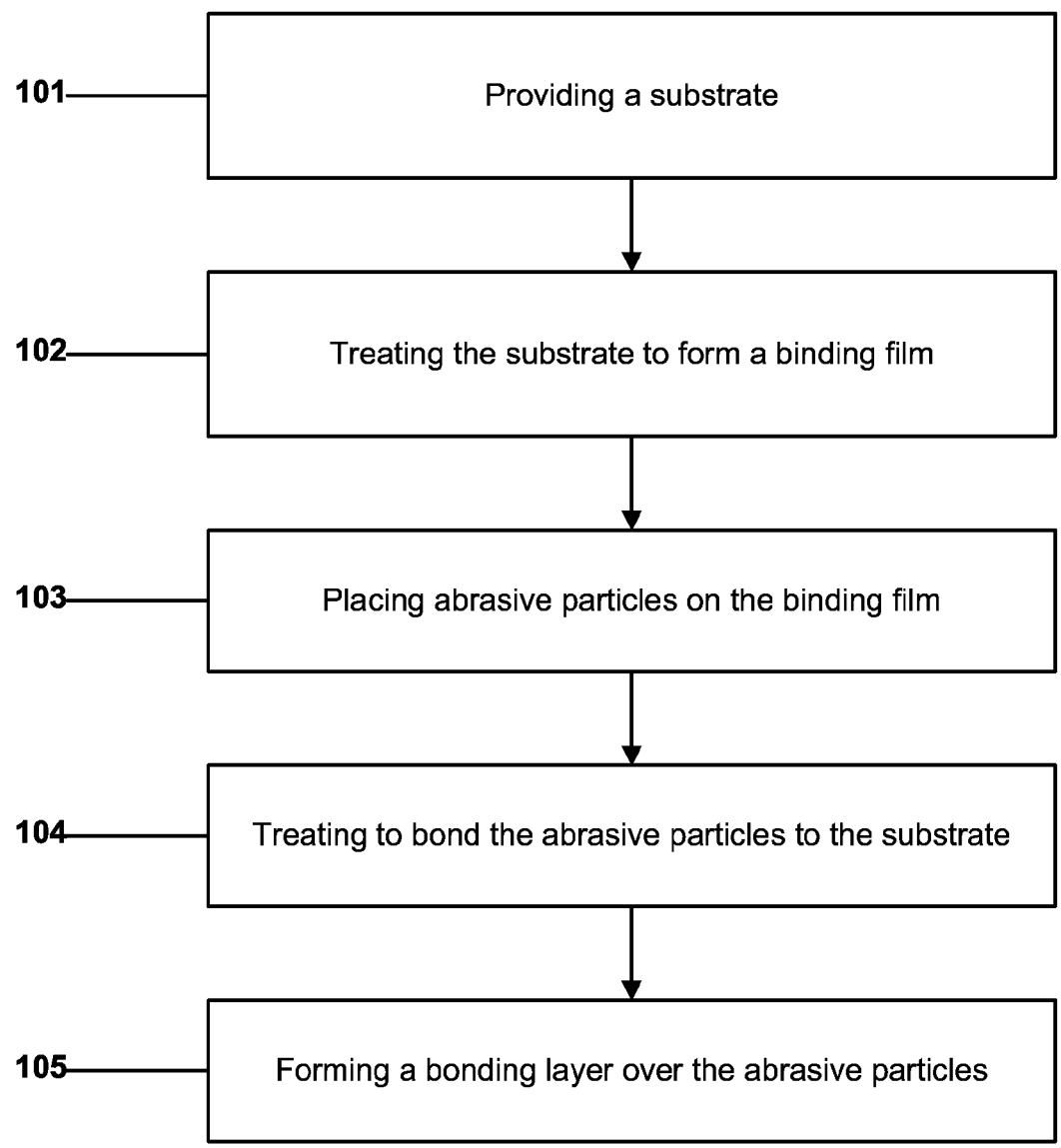
FIG. 1 includes a flow chart providing a process for forming an abrasive article in accordance with an embodiment.

FIG. 1 includes a flow chart providing a process of forming an abrasive article in accordance with an embodiment. The process can be initiated at step 101 by providing a substrate. The substrate can provide a surface for affixing abrasive materials thereto, thus facilitating the abrasive capabilities of the abrasive article.

In accordance with an embodiment, the process of providing a substrate can include a process of providing a substrate in the form of a wire. In fact, the wire substrate may be connected to a spooling mechanism. For example, the wire can be fed between a feed spool and a receiving spool. The translation of the wire between the feed spool and the receiving spool can facilitate processing, wherein the wire is translated through desired forming processes to form the component layers of the finally-formed abrasive article while being translated from the feed spool to the receiving spool.

In accordance with an embodiment, the substrate can be an elongated member having an aspect ratio of length:width of at least 10:1. In other embodiments the substrate can have an aspect ratio of at least about 100:1, such as at least 1000:1, or even at least about 10,000:1. The length of the substrate is the longest dimension measured along a longitudinal axis of the substrate. The width is a second longest (or in some cases smallest) dimension of the substrate measured perpendicular to the longitudinal axis.

Furthermore, the substrate in the form of elongated member can have a length of at least about 50 meters. In fact, other substrates can be longer, having an average length of at least about 100 meters, such as at least about 500 meters, at least about 1,000 meters, or even 10,000 meters.

Furthermore, the substrate can have a width that may not be greater than about 1 cm. Other substrates can be smaller, having an average width of not greater than about 0.5 cm, such as not greater than about 1 mm, not greater than about 0.8 mm, or even not greater than about 0.5 mm. Still, the substrate can have an average width of at least about 0.01 mm, such as at least about 0.03 mm. It will be appreciated that the substrate can have an average width within a range between any of the minimum and maximum values noted above. Moreover, in the case that a substrate is a wire having a generally circular cross-sectional shape, it will be appreciated that reference to width is reference to a diameter.

In accordance with an embodiment, the substrate can include an inorganic material, such as a metal or metal alloy material. Some substrates can include a transition metal element as recognized in the Periodic Table of Elements. For example, the substrate may incorporate elements of iron, nickel, cobalt, copper, chromium, molybdenum, vanadium, tantalum, tungsten, and a combination thereof. In accordance with a particular embodiment, the substrate can include iron, and more particularly maybe steel.

In certain instances, the substrate can have a coating overlying an outer surface of the substrate, and more particularly, can be directly bonded to an outer surface of the substrate. Certain coatings can include an inorganic material, including for example a material including a metals or metal alloys. In particular embodiments, the substrate can include a material made of a transition metal element or a combination of transition metal elements.

In certain embodiments, the substrate can be an elongated member, such as a wire, that may include a plurality of filaments braided together. That is, the substrate can be formed of many smaller wires wound around each other, braided together, or fixed to another object, such as a central core wire. Certain designs may utilize piano wire as a suitable structure for the substrate.

In further reference to the process of providing a substrate, it will be appreciated that the substrate can be spooled from a feed spool to a receiving spool at a particular rate to facilitate processing. For example, the substrate can be spooled at a rate of not less than about 5 m/min from the feed spool to the receiving spool. In other embodiments, the rate of spooling can be greater, such that it is at least about 8 m/min, at least about 10 m/min, at least about 12 m/min, or even at least about 14 m/min. The rate of spooling can be within a range between any of the minimum and maximum values noted above. It will be appreciated the spooling rate can represent the rate at which the finally-formed abrasive article can be formed.

After providing a substrate at step 101, the process can continue at step 102 by treating the substrate to form a binding film. The process of forming a binding film can include a deposition process, including for example, spraying, printing, dipping, die coating, deposition and a combination thereof. The binding film can be bonded directly to the external surface of the substrate. In fact, the binding film can be formed such that it overlies a majority of the external surface of the substrate, and more particularly, can overlie essentially the entire external surface of the substrate. In particular instances, the binding film can be formed as a single, continuous layer of uniform thickness, which can be bonded directly to the surface of the substrate. However, in certain embodiments, the binding film can be a temporary film facilitating further processing, including maintaining the position of abrasive particles when applied to the substrate.

In accordance with an embodiment, the binding film can be formed from a flux material. The flux material can be an inorganic material, organic material, or a combination thereof. For example, the flux material can be an organic material, and more notably, include an activator component comprising an organic material. Suitable inorganic materials can include metal halides (e.g., zinc chloride or ammonium chloride), hydrochloric acid, phosphoric acid, or hydrobromic acid. Other inorganic activator components can include salts, and particularly salts of mineral acids with amines are also used as aggressive activators. In one particular embodiment, the activator component can include a fluoride. In another embodiment, the flux material can include organic activator components such as carboxylic acids (e.g. fatty acids (most often oleic acid and stearic acid), dicarboxylic acids, amino acids, organohalides, and a combination thereof.

The flux material can be in the form of a generally uniform layer overlying the tacking film, and more particularly in direct contact with the tacking film. The flux material can be in the form of a liquid or paste. According to one embodiment, the flux material can be applied to the tacking film using a deposition process such as spraying, dipping, painting, printing, brushing, and a combination thereof.

After treating the substrate at step 102, the process can continue at step 103 by placing the abrasive grains on the binding film. In some instances, depending upon the nature of the process, the abrasive particles can be in direct contact with the binding film. More particularly, the abrasive particles can be in direct contact with the flux material that can have a natural viscosity and adhesive characteristic that facilitates holding the abrasive particles in place during processing, until further processes are conducted to permanently bond the abrasive particles in place relative to the binding film.

Suitable methods of providing the abrasive particles on the binding film can include spraying, gravity coating, dipping, die coating, electrostatic coating, and a combination thereof. Particularly useful methods of applying the abrasive particles can include a spraying process, conducted to apply an substantially uniform coating of abrasive particles onto the additional layer comprising the flux material.

In an alternative embodiment, the process of providing the abrasive particles can include further placing some content of the binding film material on the abrasive particles, which can facilitate adhesion between the abrasive particles and the substrate and binding film on the external surface of the substrate. The alternative process can include formation of a mixture comprising a flux material and the abrasive particles, and thereafter, application of the mixture on the substrate and/or binding film.

The abrasive particles can include materials such as oxides, carbides, nitrides, borides, oxynitrides, oxyborides, diamond, and a combination thereof. In certain embodiments, the abrasive particles can incorporate a superabrasive material. For example, one suitable superabrasive material includes diamond. In particular instances, the abrasive particles can consist essentially of diamond.

In one embodiment, the abrasive particles can include a material having a Vickers hardness of at least about 10 GPa. In other instances, the abrasive particles can have a Vickers hardness of at least about 25 GPa, such as at least about 30 GPa, at least about 40 GPa, at least about 50 GPa, or even at least about 75 GPa. Still, abrasive particles for use in the embodiments herein can have a Vickers hardness that is not greater than about 200 GPa, such as not greater than about 150 GPa, or even not greater than about 100 GPa. It will be appreciated that the abrasive particles can have a Vickers hardness within a range between any of the minimum and maximum values noted above.

The abrasive particles can have an average particle size that is determined in part by the desired end use of the abrasive article. In certain instances, the abrasive particles can have an average size that is not greater than about 500 microns. In other instances, the average particle size of the abrasive particles can be smaller, such that the average particle size is not greater than about 400 microns, not greater than about 300 microns, not greater than about 250 microns, not greater than about 200 microns, not greater than about 150 microns, or even not greater than about 100 microns. In accordance with an embodiment, the average particle size of the abrasive particles can be at least about 0.1 microns, such as at least about 0.5 microns, or even at least about 1 micron. It will be appreciated that the abrasive particles can have an average particle size within a range between any of the minimum and maximum values noted above. Such values may or may not account for additional coatings overlying the abrasive particles.

The abrasive particles may include a first coating layer over the exterior surfaces of the abrasive particles, such that the abrasive particles have a core/shell structure, wherein the core comprises abrasive particles described above, and a first coating layer overlying the core in the form of a shell layer. Suitable materials of the first coating layer can include metal or metal alloy materials. In accordance with one particular embodiment, the first coating layer can include a transition metal element, such as titanium, vanadium, chromium, molybdenum, iron, cobalt, nickel, copper, silver, zinc, manganese, tantalum, tungsten, and a combination thereof. Certain first coating layers can include nickel, such as a nickel alloy, and even alloys have a majority content of nickel, as measured in weight percent as compared to other species present within the coating layer composition. In more particular instances, the first coating layer can include a single metal species. For example, the first coating layer can consist essentially of nickel. Alternatively, the first coating layer can include copper, and may be made of a copper-based alloy, and even more particularly, can consist essentially of copper.

The abrasive particles can be formed such that the first coating layer can overly at least about 50% of the exterior surface area of the abrasive particle (i.e., the core). In other embodiments, the coverage of the first coating layer for each abrasive particle can be greater, such that the first coating layer overlies at least about 75%, at least about 80%, at least about 90%, at least about 95%, or essentially the entire exterior surface of the abrasive particle.

The first coating layer can be in direct contact with the abrasive particle (i.e., the core) and may be bonded directly to an external surface of each of the abrasive particles. In particular embodiments, the first coating layer can be electroless plated directly to an external surface of the abrasive particles.

For certain abrasive articles according to the embodiments herein, the first coating layer can be present in an amount of at least about 5% of the total weight of each of the abrasive particles. In other embodiments, the amount of the first coating layer can be greater, such that each of the abrasive particles is made to include at least about 10%, at least about 20%, or even at least about 30% of the first coating layer for the total weight of each of the abrasive particles. Still, in certain instances, the amount first coating layer present on each of the abrasive particles may be limited, such as not greater than about 100%, not greater than about 60%, not greater than about 55%, not greater than about 50%, not greater than about 45%, not greater than about 40%, or even not greater than about 38% of the total weight of each of the abrasive particles. It will be appreciated that the amount of the first coating layer present on each of the abrasive particles can be within a range between any of the minimum and maximum percentages noted above.

According to one embodiment, the first coating layer can have an average thickness of not greater than about 12 microns. In other instances, the thickness of the first coating layer can be less, such as not greater than about 10 microns, not greater than about 8 microns, not greater than about 6 microns, or even not greater than about 5 microns. Still, the average thickness of the first coating layer can be at least about 0.2 microns, at least about 0.5 microns, such as at least about 0.7 microns, or even at least about 1 micron. It will be appreciated that the average thickness of the first coating layer can be within a range between any of the minimum and maximum values noted above.

The first coating layer can be formed to have an average thickness of not greater than about 80% of an average particle size of the abrasive particles as measured by the core. According to one embodiment, the first coating layer can be formed such that it has an average thickness of not greater than about 70%, not greater than about 60%, not greater than about 50%, such as not greater than about 40%, or even not greater than about 30% of the average particle size of the abrasive particles. In yet other embodiments, the average thickness of the first coating layer can be at least about 1%, at least about 5%, at least about 10%, or even at least about 12% of an average particle size of the abrasive particles. It will be appreciated that the average thickness of first coating layer can be within a range between any of the minimum and maximum values noted above.

The abrasive particles may further include a second coating layer overlying the first coating layer. The second coating layer can be directly bonded to the first coating layer. More particularly, at least a portion of the second coating layer can be spaced apart from the external surface of the abrasive particles by the first coating layer, such that the abrasive particles comprise a core made of the abrasive particles, a first shell made of the first coating layer and a second shell overlying the first shell made of the second coating layer.

In accordance with an embodiment, the second coating layer can be formed from a metal, metal alloy, metal matrix composite, and a combination thereof. In one particular embodiment, the second coating layer can be formed of a material including a transition metal element. For example, the second coating layer can be a metal alloy including a transition metal element. Some suitable transition metal elements can include, for example, lead, silver, copper, zinc, tin, titanium, molybdenum, chromium, iron, manganese, cobalt, niobium, tantalum, tungsten, palladium, platinum, gold, ruthenium, and a combination thereof. According to one particular embodiment, the second coating layer can be made of a metal alloy including tin and lead, such as a 60/40 tin/lead composition. In another embodiment the second coating layer can be made of a material having a majority content of tin. In fact, in certain abrasive articles, the second coating layer can be made of a material consisting essentially of tin.

In accordance with an embodiment, the second coating layer can be a low temperature metal alloy (LTMA) material. It will be appreciated that a LTMA material includes a material having a particular melting point, such as not greater than about 450° C. LTMA materials can be distinct from high melting temperature materials, including for example, braze materials, which can have significantly higher melting points, typically greater than 500° C. Furthermore, brazing materials may have different compositions. Still, in accordance with an embodiment, the LTMA material of the embodiments herein may be formed of a material having a melting point of not greater than about 400° C., such as not greater than about 375° C., not greater than about 350° C., not greater than about 300° C., or not greater than about 250° C. Still, the LTMA material may have a melting point of at least about 100° C., such as at least about 125° C., at least about 150° C., or even at least about 175° C. It will be appreciated that the LTMA material can have a melting point within a range between any of the minimum and maximum temperatures noted above.

For certain embodiments, the second coating layer can overlie at least about 50% of an exterior surface area of the first coating layer on each of the abrasive particles. In other instances, the second coating layer can cover more area, including for example, at least about 60%, at least about 70%, at least about 75%, at least about 80%, at least about 85%, at least about 90%, or even essentially all of the entire exterior surface area of the first coating layer on each of the abrasive particles.

For certain abrasive articles according to the embodiments herein, the second coating layer can be present in an amount of at least about 10% of the total weight of each of the abrasive particles including the core of abrasive particle material and the first coating layer. In other embodiments, the amount of the second coating layer can be greater, such that each of the abrasive particles includes at least about 15%, at least about 20%, or even at least about 25% of the second coating layer for the total weight of each of the abrasive particles including the first coating layer. Still, in particular instances, the amount second coating layer present on each of the abrasive particles may be limited, such as not greater than about 500%, not greater than about 400%, not greater than about 300%, not greater than about 200%, not greater than about 100%, not greater than about 80%, or even not greater than about 60% of the total weight of each of the abrasive particles including the first coating layer. It will be appreciated that the amount of the second coating layer present on each of the abrasive particles can be within a range between any of the minimum and maximum percentages noted above.

According to one embodiment, the second coating layer can have an average thickness of not greater than about 12 microns. In other instances, the thickness of the second coating layer can be less, such as not greater than about 10 microns, not greater than about 8 microns, not greater than about 6 microns, or even not greater than about 5 microns. Still, the average thickness of the second coating layer can be at least about 0.2 microns, at least about 0.5 microns, such as at least about 0.7 microns, or even at least about 1 micron. It will be appreciated that the average thickness of second coating layer can be within a range between any of the minimum and maximum values noted above.

The second coating layer can be formed to have an average thickness of not greater than about 80% of an average particle size of the abrasive particles as measured by the core and excluding the first coating layer. According to one embodiment, the second coating layer can be formed such that it has an average thickness of not greater than about 70%, not greater than about 60%, not greater than about 50%, such as not greater than about 40%, or even not greater than about 30% of the average particle size of the abrasive particles. In yet other embodiments, the average thickness of the second coating layer can be at least about 2%, at least about 5%, at least about 8%, or even at least about 12% of an average particle size of the abrasive particles. It will be appreciated that the average thickness of second coating layer can be within a range between any of the minimum and maximum values noted above.

According to one embodiment, the first coating layer can have an average thickness greater than an average thickness of the second coating layer. However, in other instances, the first coating layer can have an average thickness less than an average thickness of the second coating layer. And yet for other abrasive particles, the first coating layer comprises an average thickness substantially equal to an average thickness of the second coating layer, such that the average thickness of the first and second coatings are not greater than about 5% different based upon the coating layer having the greater thickness.

After placing the abrasive particles on the binding film at step 103, the process can continue at step 104 by treating to bond the abrasive particles to the substrate. Treating may include processes such as heating, curing, drying, and a combination thereof. In one particular embodiment, treating includes a thermal process, such as heating at a temperature sufficient to induce melting of the binding film and second coating layer, while avoiding excessive temperatures to limit damage to the abrasive grains and substrate. For example, treating can include heating the substrate, binding film, and abrasive grains to a temperature of not greater than about 450° C. Notably, the process of treating can be conducted at a treating temperature that is less, such as not greater than about 375° C., not greater than about 350° C., not greater than about 300° C., or even not greater than about 250° C. In other embodiments, the process of treating can include heating at a temperature of at least about 100° C., at least about 150° C., or even at least about 175° C.

It will be appreciated that the heating process can facilitate melting of materials within the binding film and second coating layer of the abrasive particles comprising to bond the abrasive particles to the substrate. Notably, in the context of coated abrasive particles, diffusion bonding regions can be formed between portions of the coating on the abrasive particles and portions of the substrate, and more particularly, between portions of the second coating layer and the portions of the substrate. The diffusion bonding regions can be characterized by an interdiffusion between at least one chemical species (e.g., metallic element) of the substrate and at least one chemical species (e.g., metallic element) of the second coating layer overlying the abrasive particles. Further details of the diffusion bonding regions will be described herein.

After treating to bond, an option step (not illustrated in FIG. 1) can be undertaken to remove a portion of or all of the binding film material from the external surface of the substrate. Suitable processes for removal of the binding material can include washing, scrubbing, wiping, spraying, drying, heating, and a combination thereof. The surface of the article formed after the treating process at step 104 can be cleaned or rinsed to remove unwanted materials (e.g., residual flux material from the additional layer).

After treating at step 104, the process can continue at step 105, by forming a bonding layer over the abrasive particles and the substrate. Formation of the bonding layer can facilitate formation of an abrasive article having improved wear resistance. Furthermore, the bonding layer can enhance abrasive particle retention for the abrasive article. In accordance with an embodiment, the process of forming the bonding layer can include deposition of the bonding layer on the external surface of the article defined by the abrasive particles, the external surface of the substrate, and the diffusion bonding regions surrounding the abrasive particles. In fact, the bonding layer can be bonded directly to the abrasive particles, the external surface of the substrate, and the diffusion bonding regions.

The formation of the bonding layer can include processes such as plating, spraying, dipping, printing, and a combination thereof. In accordance with one particular embodiment, the bonding layer can be formed by an electroplating process. In an alternative embodiment, the bonding layer may be formed via an electroless plating process.

The bonding layer can be formed such that it overlies, and more particularly directly contacts the second coating layer of the abrasive particles and the external surface of the substrate. According to one particular embodiment, the bonding layer can overlie at least 90% of the exposed surfaces of the abrasive particles and the external surface of the substrate. In other embodiments, the coverage of the bonding layer can be greater, such that it overlies at least about 92%, at least about 95%, or even at least about 97% of the exposed surfaces of the abrasive particles and the external surfaces of the substrate. In one particular embodiment, the bonding layer can be formed such that it overlies essentially all the exposed surfaces of the abrasive particles and the substrate, wherein the bonding layer can completely cover the components of the abrasive article defining the exterior surface of the abrasive article.

The bonding layer can be made of a material such as an organic material, inorganic material, and a combination thereof. Some suitable organic materials can include polymers such as UV curable polymer, thermosets, thermoplastics, and a combination thereof. Some other suitable polymer materials can include urethanes, epoxies, polyimides, polyamides, acrylates, polyvinyls, and a combination thereof.

Suitable inorganic materials for use in the bonding layer can include metals, metal alloys, cermets, ceramics, composites, and a combination thereof. In one particular instance, the bonding layer can be formed of a material having at least one transition metal element, and more particularly a metal alloy containing a transition metal element. Some suitable transition metal elements for use in the bonding layer can include lead, silver, copper, zinc, tin, titanium, molybdenum, chromium, iron, manganese, cobalt, niobium, tantalum, tungsten, palladium, platinum, gold, ruthenium, and a combination thereof. In certain instances, the bonding layer can include nickel, and may be a metal alloy comprising nickel, or even a nickel-based alloy. In still other embodiments, the bonding layer can consist essentially of nickel.

According to one embodiment, the bonding layer can have an average thickness of at least about 10% of an average particle size of the abrasive particles, excluding the first and second coating layers. In another embodiment, the bonding layer can have an average thickness of at least about 20%, at least about 30%, at least about 40%, or even at least about 50%. In still another embodiment, the bonding layer can have an average thickness of not greater than about 100%, not greater than about 90%, not greater than about 85%, such as not greater than about 80%, or even not greater than about 75% of the average particle size of the abrasive particles.

In more particular instances, the bonding layer can have an average thickness of at least about 1 micron, such as at least about 2 microns, at least about 5 microns, at least about 10 microns, or even at least about 20 microns. Yet, in some embodiments, the bonding layer can be formed such that it has an average thickness of not greater than about 100 microns, not greater than about 90 microns, not greater than about 80 microns, not greater than about 70 microns.

In accordance with one embodiment, the bonding layer can be made of a material, including for example composite materials, having a hardness that is greater than a hardness of the material of the diffusion bonding regions and/or the second coating layer. For example, the bonding layer can have a Vickers hardness that is at least about 5% harder than a Vickers hardness of the diffusion bonding regions. In fact, in other embodiments, the Vickers hardness of the bonding layer can be at least about 10%, such as at least about 20%, at least about 30%, at least about 40%, at least about 50%, at least about 75%, or even at least about 100% harder as compared to a Vickers hardness of the diffusion bonding regions and/or the second coating layer.

Additionally, the bonding layer can have a fracture toughness (K1c) as measured by indentation methods, that is at least about 5% greater than an average fracture toughness of the material of the diffusion bonding regions and/or the second coating layer. In a particular embodiment, the bonding layer can have a fracture toughness (K1c) that is at least about 8% greater, at least about 10% greater, at least about 15% greater, at least about 20% greater, at least about 25% greater, at least about 30% greater, or even at least about 40% greater than a fracture toughness of the material of the diffusion bonding region and/or the second coating layer.

Optionally, the bonding layer can include a filler material. The filler can be various materials suitable for enhancing performance properties of the finally-formed abrasive article. Some suitable filler materials can include abrasive grains, pore-formers such as hollow sphere, glass spheres, bubble alumina, natural materials such as shells and/or fibers, metal particles, and a combination thereof.

In one particular embodiment, the bonding layer can include a filler in the form of abrasive grains. The abrasive grains of the filler can be significantly different than the abrasive particles, particularly with regard to size, such that in certain instances the abrasive grain filler can have an average grain size that is substantially less than the average size of the abrasive particles bonded to the tacking film. For example, the abrasive grain filler can have an average grain size that is at least about 2 times less than the average particle size of the abrasive particles, which can be measured by the size of the core of the abrasive particles, excluding the first and second coating layers. In fact, the abrasive filler may have an average grain size that is even smaller, such as on the order of at least 3 times less, such as at least about 5 times less, at least about 10 times less, and particularly within a range between about 2 times and about 10 times less than the average particle size of the abrasive particles.

The abrasive grain filler within the bonding layer can be made from a material such as carbides, carbon-based materials (e.g. fullerenes), borides, nitrides, oxides, oxynitrides, oxyborides, and a combination thereof. In particular instances, the abrasive grain filler can be a superabrasive material such as diamond, cubic boron nitride, or a combination thereof. It will be appreciated that the abrasive grain filler can be the same material as that of the abrasive particles bonded to the tacking film. In other instances, the abrasive grain filler can include a different material than the material of the abrasive particles bonded to the tacking film.

Figure 2:
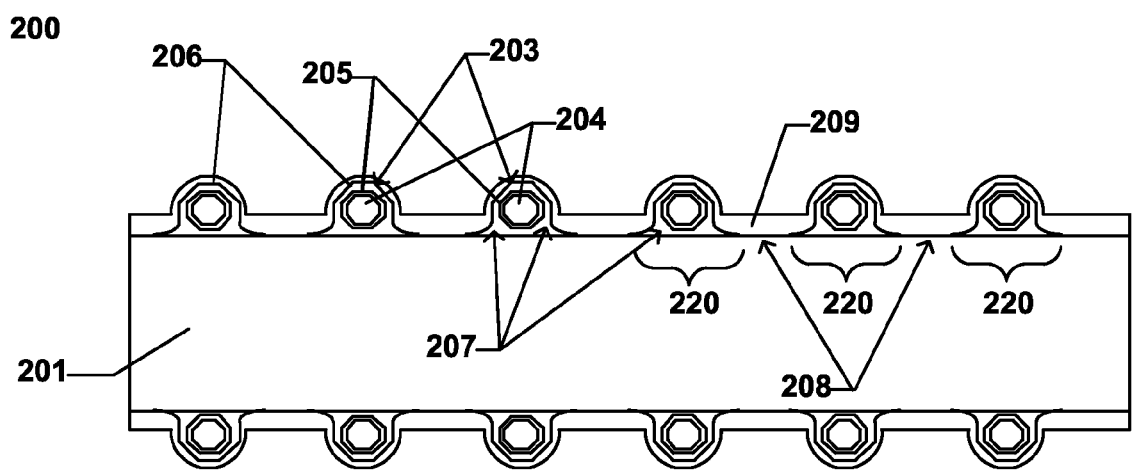
FIG. 2 includes a cross-sectional illustration of a portion of an abrasive article in accordance with an embodiment.

FIG. 2 includes a cross-sectional illustration of a portion of an abrasive article in accordance with an embodiment. As illustrated, the abrasive article 200 can include a substrate 201, which is in the form of an elongated member such as a wire. As further illustrated, the abrasive article can include abrasive particles 203 overlying and attached to an external surface of the substrate 201. Notably, the abrasive particles 203 can include a core 204 comprising the abrasive grit material (e.g., diamond grit), a first coating layer 205 overlying the core, and a second coating layer 206 overlying the first coating layer 205. The abrasive particles 203 can be bonded directly to the surface of the substrate 201, and can be in direct contact with a surface of the substrate, and may not necessarily have an intervening layer.

In particular embodiments, the abrasive particles 203 can be bonded to the substrate 201 at diffusion bonding regions 207 comprising an interdiffusion of the material of the second coating layer 206 and the substrate 201. According to one embodiment, the diffusion bonding regions 207 are localized to regions around the abrasive particles 203. Moreover, the diffusion bonding regions 207 are preferentially located at the interface of the abrasive particles 203 and the substrate 201, and can define gaps 208 between the abrasive particles 203, wherein the gaps 208 are regions along the abrasive article absent the diffusion bond region composition. Furthermore, the gaps can be defined as regions between abrasive particles 203, wherein the bonding layer 209 is in direct contact with the substrate 201.

As such, an abrasive article according to an embodiment can be characterized by a discontinuous coating preferentially surrounding the abrasive particles 203 and leaving gaps or an absence of a material in regions between the abrasive particles 203. In particular instances, the discontinuous coating can be defined by the material of the second coating layer 206 and diffusion bonding regions 207, which can include a material from the second coating layer 206 and the substrate 201. In certain embodiments the discontinuous coating can define coated regions 220 comprising a low temperature metal alloy (LTMA) material surrounding and overlying a majority of the abrasive particles 203 and gap regions 208 between the abrasive particles 203. In certain instances, the gap regions 208 can account for a minority of the surface area of the outer surface of the substrate 201, including for example, not greater than about 48%, not greater than about 40%, not greater than about 35%, not greater than about 30%, not greater than about 25%, not greater than about 20%, not greater than about 15%, or even not greater than about 12% of the total outer surface area of the substrate 201. Still, the gap regions 208 can make up at least about 1%, such as at least about 3%, or at least about 5% of the total surface area of the outer surface of the substrate 201.

The abrasive article 200 can include a bonding layer 209 overlying the external surfaces of the abrasive particles 203 and can be bonded directly to the second coating layer 206 of the abrasive particles 203 and portions of the external surface of the substrate 201 within gaps 208 between the diffusion bonding regions 207.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising:
  a substrate comprising a wire;
  abrasive particles affixed to the substrate, the abrasive particles comprising:
    a first coating layer overlying the abrasive particles; and
    a second coating layer different than the first coating layer overlying the first coating layer, wherein the second coating layer has a melting point of not greater than about 450° C.; and
  a bonding layer overlying the substrate and abrasive particles, wherein the bonding layer overlies all of the external surfaces of the abrasive particles and the substrate, and
  wherein a diffusion bonding region is formed between the second coating layer and the substrate.

2. The abrasive article of claim 1, wherein the substrate comprises an inorganic material.

3. The abrasive article of claim 1, wherein the substrate comprises an elongated member having an aspect ratio of length:width of at least about 10:1.

4. The abrasive article of claim 1, wherein the first coating layer comprises a metal selected from the group of metals consisting of titanium, vanadium, chromium, molybdenum, iron, cobalt, nickel, copper, silver, zinc, manganese, tantalum, tungsten, and a combination thereof.

5. The abrasive article of claim 1, wherein the first coating layer overlies at least about 50% of an exterior surface area of each of the abrasive particles.

6. The abrasive article of claim 1, wherein the first coating layer comprises at least about 5% of the total weight of each of the abrasive particles.

7. The abrasive article of claim 1, wherein the first coating layer comprises an average thickness greater than an average thickness of the second coating layer.

8. The abrasive article of claim 1, wherein the second coating layer comprises a metal alloy of tin and lead.

9. The abrasive article of claim 1, wherein the second coating layer overlies at least about 50% of an exterior surface area of the first coating layer on each of the abrasive particles.

10. The abrasive article of claim 1, wherein the second coating layer comprises at least about 10% of the total weight of each of the abrasive particle and the first coating layer.

11. The abrasive article of claim 1, wherein the second coating layer comprises an average thickness of not greater than about 12 microns.

12. The abrasive article of claim 1, wherein the second coating layer comprises an average thickness of not greater than about 80% of an average particle size of the abrasive particles.

13. The abrasive article of claim 1, wherein the bonding layer directly contacts the second coating layer.

14. The abrasive article of claim 1, wherein the bonding layer comprises a metal selected from the group of metals consisting of lead, silver, copper, zinc, tin, titanium, molybdenum, chromium, iron, manganese, cobalt, niobium, tantalum, tungsten, palladium, platinum, gold, ruthenium, and a combination thereof.

15. The abrasive article of claim 1, wherein the bonding layer comprises an average thickness of at least about 10% and not greater than about 100% of the average particle size of the abrasive particles.

* * * * *